United States Patent
Kumada et al.

[11] 3,740,836
[45] June 26, 1973

[54] METHOD OF PRODUCING A CORELESS ARMATURE

[75] Inventors: Shoji Kumada; Tadashi Tanaka, both of Iruma, Japan

[73] Assignee: Kabushiki Kaisha Yaskawa Denki Seisakusho, Fukuoka-ken, Japan

[22] Filed: Sept. 28, 1971

[21] Appl. No.: 184,473

[30] Foreign Application Priority Data
Sept. 28, 1970 Japan............................... 45/85678

[52] U.S. Cl...................... 29/598, 29/605, 310/266
[51] Int. Cl...................... H02k 15/02, H02k 15/10
[58] Field of Search...................... 29/598, 596, 605; 310/266

[56] References Cited
UNITED STATES PATENTS
3,538,364  11/1970  Favereau ........................ 310/266 X
3,488,837  1/1970  Massouda ........................ 310/266 X
3,675,102  7/1972  Sidorov et al..................... 310/266
3,290,528  12/1966  Adler et al......................... 310/266

FOREIGN PATENTS OR APPLICATIONS
635,624  4/1950  Great Britain..................... 310/266

*Primary Examiner*—Charles W. Lanham
*Assistant Examiner*—Carl E. Hall
*Attorney*—John Thomas Cella

[57] ABSTRACT

A coreless armature and a method for producing the same, characterized in that, on the outer surface of an annular body, a plurality of teeth-like projections are provided with equal spacing therebetween and in a manner extending along the generatrices of the annular body from a base part thereof, effective parts of armature coils are inserted evenly in the slots formed between the teeth-like projections, and the entire assembly is thereafter impregnated with a synthetic resin for solidifying the assembly into an integral body. The base part of the annular body from which the plurality of teeth-like projections project may be removed thereafter from the thus solidified armature assembly.

1 Claim, 3 Drawing Figures

METHOD OF PRODUCING A CORELESS ARMATURE

BACKGROUND OF THE INVENTION

This invention relates generally to armatures having no iron cores, and more particularly to an improvement thereof wherein structural unbalance as well as magnetic unbalance are substantially eliminated. The invention also relates to an improved method for producing the coreless armature of the above described features.

In a control system such as that for a peripheral apparatus for electronic computers or a numerically controlled machine tool, wherein precision control is particularly essential, a tachometer generator of highly accurate operational characteristics is required, and one of the fundamental requirements for the tachometer generator is that no ripple be included in the induced voltage. A reason for the inclusion of ripples in the induced voltage of the conventional tachometer generator is the difficulty of eliminating structural or magnetic unbalance in the armature winding. Although the influence of the magnetic unbalance can be substantially eliminated by a coreless construction of the armature (or by the moving coil type armature), such a construction of the armature has been found to have a tendency to cause far greater unbalance in the distribution of coils than the ordinary armature wherein coils are distributed in the core slots.

Another requirement for the tachometer generator applied in the above mentioned technical fields is that the momentum of the armature be substantially minimized so that instantaneous variation of the measurement can be detected with fidelity.

SUMMARY OF THE INVENTION

Therefore, a primary object of the present invention is to provide an improved armature having no iron core, wherein all of the above described drawbacks of the conventional apparatus can be substantially eliminated.

Another object of the present invention is to provide an improved armature of, for instance, a tachometer generator which is simple in construction and easy to manufacture.

Still another object of the present invention is to provide an improved armature of, for instance, a tachometer generator, the moment of inertia of which can be substantially minimized.

A further object of the present invention is to provide an improved armature of coreless type, wherein the above mentioned distributional unbalance as well as the magnetic unbalance can be substantially eliminated.

An additional object of the present invention is to provide an improved method for producing the coreless armature wherein all of the above described advantageous features are preserved.

These and other objects of the present invention can be achieved by an armature of coreless type and a method for producing the same, wherein on the outer surface of an annular body, a plurality of teeth-like projections are provided with equal spacing therebetween and in a manner extending along the generatrices of the annular body, effective parts of armature coils are inserted evenly in the slots formed between the teeth-like projections, and the entire assembly is thereafter impregnated with a synthetic resin for solidifying the assembly into an integral body. In one aspect, the base portion of the annular body from which the plurality of teeth-like projections project is removed thereafter from the thus solidified armature assembly.

The nature, principle, and utility of the present invention will be better understood from the following detailed description of the invention when read in conjunction with the accompanying drawing, in which like parts are designated by like reference numerals.

DETAILED DESCRIPTION OF THE INVENTION

Figure 1:
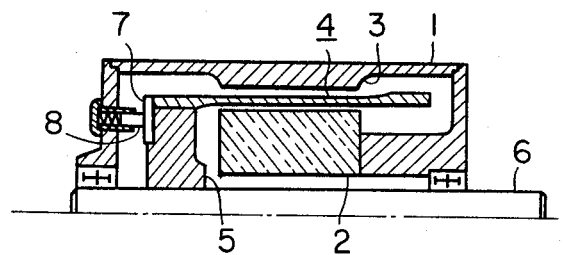
FIG. 1 is a longitudinal sectional view of the upper half of a d.c. apparatus wherein an armature according to the present invention is employed.

Referring now to FIG. 1, there is indicated therein a d.c. machine or apparatus employing the coreless armature according to the present invention. The apparatus or machine comprises a machine frame 1, an annular permanent magnet 2 including field poles, a yoke 3 formed in a part of the machine frame 1 to oppositely confront the annular permanent magnet 2 through an air gap, an armature 4 having no iron core rotatably positioned in the air gap, and a shaft 6 coupled to the armature 4 through a hub 5. In the d.c. apparatus of machine, there are further provided a commutator 7 and brushes 8 for passing an electric current in or out of the d.c. machine or apparatus.

Figure 2:
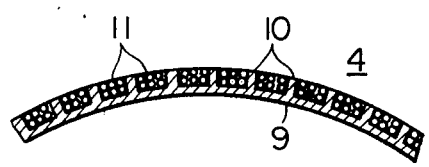
FIG. 2 is a fragmental sectional view of an armature constituting an embodiment of the present invention.

FIG. 2 shows an example of the armature 4 which constitutes a preferred embodiment of the invention. The armature comprises an annular body 9 made of a synthetic resin and having projections 10 of twice the number of the armature coils extending radially outwardly of the annular body 9 with equal spacing therebetween and having a height equal to that of the effective part of the armature coil. Between each pair of the two adjacent projections 10, an effective part 11 of the armature coils is interposed, and, when it is required, a bind wire of, for instance, glass tape is wound around the outer surface of the armature 4. The armature thus assembled is thereafter impregnated with a synthetic resin to be solidified into an armature of rigid construction.

Figure 3:
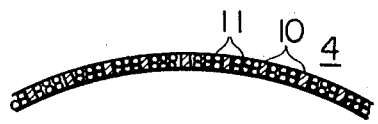
FIG. 3 is a view similar to FIG. 2 of an armature constituting another embodiment of the present invention.

In another embodiment of the present invention as illustrated in FIG. 3, the base part of the annular body 9 of the armature thus solidified is removed by machining or by merely pulling out. In the latter case, the base part and the teeth-like projections 10 of the annular body 9 are made easily separable beforehand. Preferably the base part of the annular body 9 is divided into two or three pieces. The armature of this embodiment is apparently of a lower inertia than that of the previous embodiment.

Although in the above description, the number of the teeth-like projections has been selected to be twice the number of coils, this number may be equal to the number of coils as in the case of as ordinary armature or may be more than the number of coils so that the coil sides of the armature are dividedly introduced in between the teeth-like projections.

As described above, the effective parts of the armature coils are positioned by the equally spaced teeth-like projections, whereby the structural unbalance of the armature coils is eliminate regardless of its coreless construction, and the ripples in a tachometer generator, for instance, can be minimized. Furthermore, the winding insertion in the armature according to the present invention can be greatly simplified because of the existence of the teeth-like projections of the annular body.

We claim:

1. A method for producing a coreless armature comprising the steps of providing on the outer surface of an annular body of insulating material a plurality of teeth-like projections equally spaced apart from each other and extending in the direction of the axis of the annular body from a base part thereof, inserting effective parts of armature coils evenly in the slots formed between the teeth-like projections, impregnating the entire assembly with a synthetic resin for solidifying the assembly into an integral body, thereafter removing said base part of the annular body from the solidified armature assembly.

* * * * *